United States Patent Office 3,545,205
Patented Dec. 8, 1970

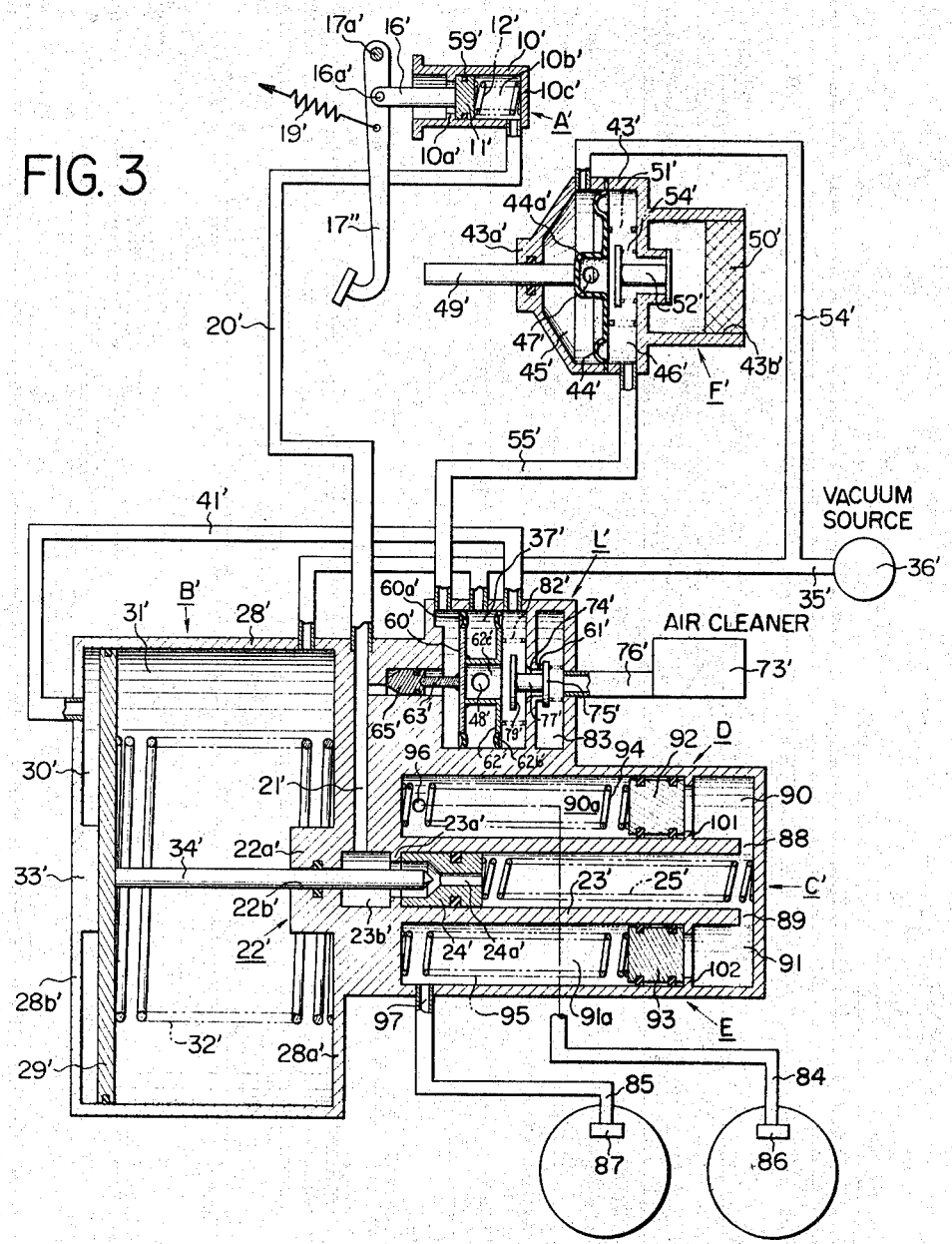

3,545,205
FAIL SAFE ARRANGEMENT FOR VEHICLE BRAKE MECHANISMS
Saburo Fujita, Toshiharu Adachi, and Yoichi Furuta, Kariya-shi, Aichi-ken, Japan, assignors to Aisin Seiki Company Limited, Asahi-machi, Kariya-shi, Aichi-ken, Japan
Filed Sept. 23, 1968, Ser. No. 761,517
Claims priority, application Japan, Sept. 23, 1967, 42/61,400
Int. Cl. F01b 25/02; F15b 7/00; B60t 15/16
U.S. Cl. 60—54.5
4 Claims

ABSTRACT OF THE DISCLOSURE

A vehicle brake system provided with a fail safe emergency apply means comprising a safety valve assembly and a control valve mechanism which is actuated by movement of a brake apply pedal beyond a predetermined stroke length and adapted for delivery of atmospheric air to said control valve mechanism for hydraulically actuating the wheel brake system through a conventional pneumatic and hydraulic booster assembly.

---

This invention relates to improvements in a vehicle brake system utilizing a brake booster of the combined pneumatic and hydraulic type. The system is controlled by the hydraulic pressure generated in a master cylinder having a piston operated by a brake pedal which is actuated by an operator of the vehicle fitted with said brake system.

It is the main object to provide an improved and efficient brake system which is fail safe and operable even when loss of or a considerable decrease in the hydraulic pressure in the brake system should unintentionally occur.

It is a further object to provide an improved brake system of the kind capable of utilizing the operation of the combined pneumatic and hydraulic booster even when said loss of hydraulic pressure in the hydraulic brake system should occur.

It is a still further object of the invention to provide an improved brake system wherein the foot-operated brake pedal serves as sensing means for detecting said loss of or decrease in pressure in the hydraulic brake system when a vehicle driver actuates the brake pedal.

It is a still further object of the invention to provide an improved brake system of the above kind, which is provided with a unique safety means which can be operated by the foot pedal in a repeated way as desired by the driver, as if the master cylinder is operating in the regular manner although it practically fails to function.

It is a still further object to provide an improved brake system of the above kind wherein said safety means provides a reaction force which is a function of the braking effort exerted upon the foot pedal.

It is a still another object to provide an improved brake system of the above kind which is reliable in its function, economic in its function, economic in its manufacture and well adapted for conventional vehicle brake system by slight modification thereof.

These and further objects, features and advantages of the invention will become more clear as the description proceeds by reference to the accompanying drawings which are illustrative of substantially two preferred embodiments of the invention. It should be understood that the shown embodiments are given for illustrative purposes only and thus should not be construed in any way as a limitation of the invention. Various other changes and modifications will easily occur to those skilled in the art after reading the following detailed description of the invention. Thus, these are included in practice of the invention, so far as they fall within the scope and spirit of the invention as set forth in the appended claims.

In the drawings:

FIG. 3 is a similar view to FIG. 1, illustrating a second embodiment of the invention.

Figure 1:
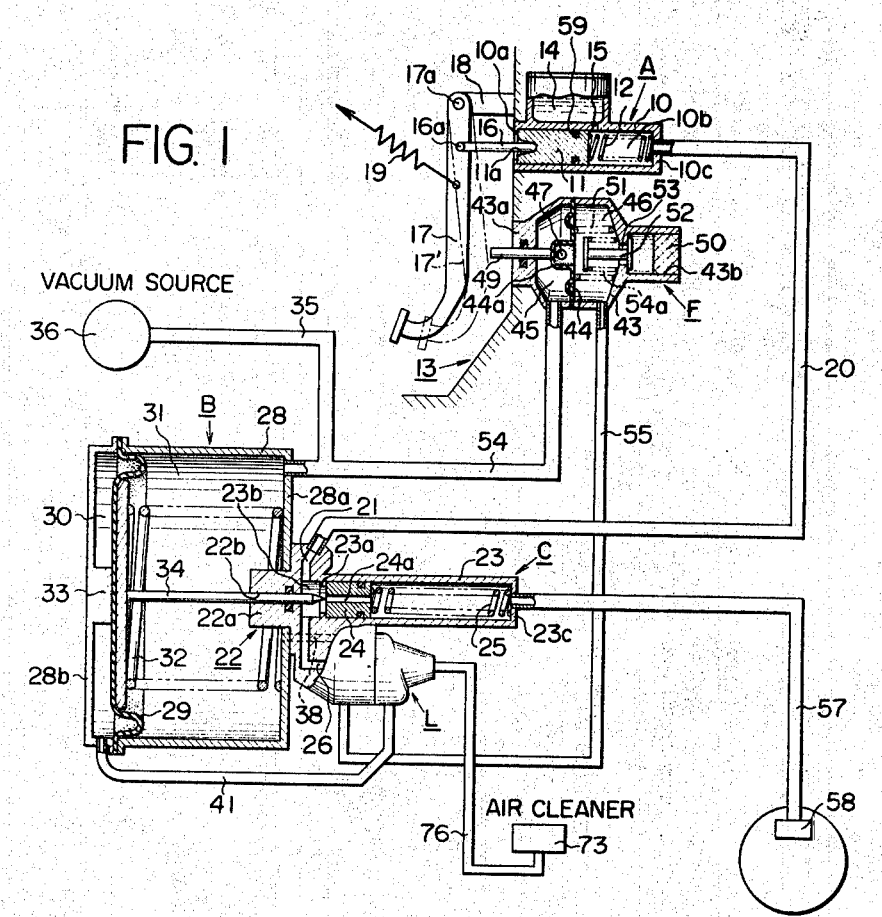
FIG. 1 is a schematic and illustrative view of a first embodiment of the invention wherein several parts are shown in section for the illustration of inner working parts.
Figure 2:
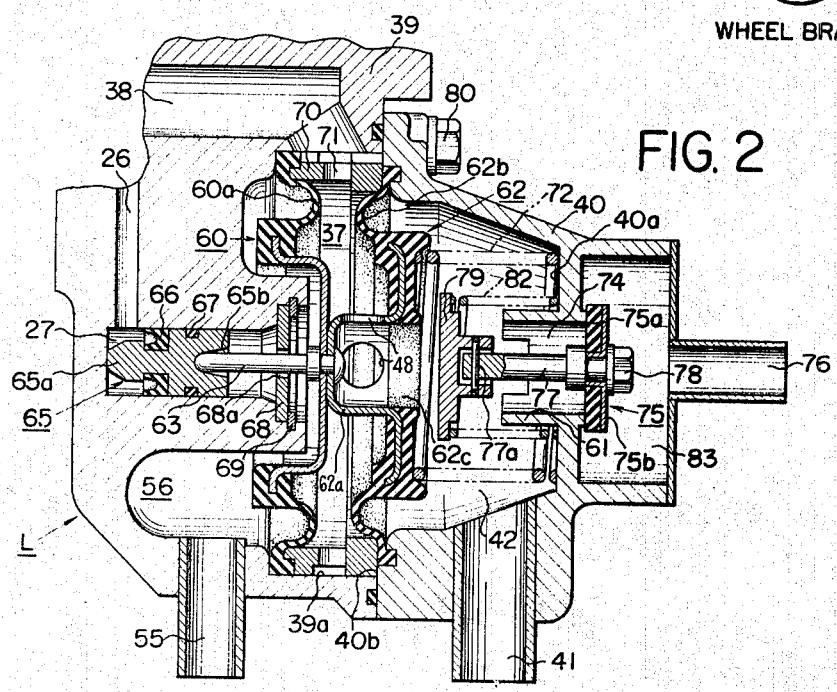
FIG. 2 is an enlarged and specific longitudinal sectional view of a control valve assembly employed in the embodiment shown in FIG. 1.

Referring now to the drawings, more specifically to FIGS. 1 and 2 thereof, the first embodiment of the present invention will be described in detail.

In these figures, the booster means comprises a brake booster of conventional design and generally shown at B, hydraulic cylinder means generally shown at C and again of a conventional design, and control valve mechanism L which has been considerably improved as will be seen hereinafter.

Master cylinder means of a conventional design and generally shown at A in FIG. 1, comprises substantially a master cylinder 10, a hydraulic piston 11 slidably mounted therein, and a return spring 12 housed in the cylinder and urging the piston towards stop means 10a which is formed integral with said cylinder at its open end. Said cylinder 10 is fixed to a part 13 of the conventional vehicle chassis, and a reservoir 14 containing a certain quantity of a kind of hydraulic liquid such as oil is formed integrally with the stationary cylinder 10. In the upper cylinder wall, there is provided a communicating opening 15 which serves for replenishing oil from the reservoir 14 into the cylinder chamber 10b, in which said return spring 12 is located.

Piston 11 is formed at its front end with a recess 11a for receiving the actuating end of a push rod 16, the opposite end of which is pivotably connected at 16a to a conventional brake pedal 17 pivotably mounted at its upper 17a by a stationary arm 18 fixed to said chassis part 13. Brake pedal 17 is fitted with a return spring 19 in a conventional manner. A brake piping 20 is connected fluidically through the end wall 10c of cylinder 10 with the chamber 10b thereof as shown, while the opposite end of said piping is fluidically connected with a port 21 formed in block piece 22 formed integral with hydraulic cylinder 23. This cylinder is provided with a hydraulic piston 24 slidably housed therein and formed with a longitudinal bore 24a therethrough. Return spring 25 is located in the cylinder 23 for urging the piston 24 towards stop means 23a formed integral with the cylinder 23. Stop means 24a defines a hydraulic chamber 23b in fluid communication with said port 21, and with duct 26 leading to hydraulic control cylinder chamber 27.

Block piece 22 is formed integrally with a cylindrical projection 22a which is sealingly and fixedly attached to the end wall 28a of booster cylinder 28 of said brake booster means B. The cylinder 28 houses movably therein a power piston 29 which sealingly divides the interior space of the cylinder into a variable pressure chamber 30 and a constant pressure chamber 31. Return spring 32 is also housed in the constant pressure chamber, thereby urging the power piston towards a stationary stop 33 formed integral with another end wall 28b of said cylinder 28. A pointed piston rod 34 is attached to power piston 29 and extends horizontally in FIG. 1 through said constant pressure chamber 31 and passes through the sealed bore 22b, which is bored axially through said block piece 22, so as to enable its pointed end to cooperate hydraulically and mechanically with the axial bore 24a, as will be described more in detail hereinafter.

Constant pressure chamber 31 is fluidically connected through piping 35 to a vacuum source 36. Although only schematically shown, this vacuum source may consist of the conventional intake manifold of the engine, not shown, which is used in the automotive vehicle being fitted in turn with the braking system according to this invention. On the other hand, said constant pressure chamber 31 is fluidically connected with a vacuum chamber 37 of control valve mechanism L through a communication duct 38 which is shown schematically by dotted lines in FIG. 1 as passing through end wall 28a and block piece 22, and is clearly shown in FIG. 2 as passing through valve block 39 to which a cover 49 is rigidly bolted.

Variable pressure chamber 30 is fluidically connected through connecting piping 41 to variable pressure chamber 42 formed in the control valve mechanism L.

Safety valve assembly generally shown at F comprises a cylinder member 43 which is provided with diaphragm piston 44 defining cylinder chambers 45 and 46 kept normally in fluid communication with each other through a plurality of openings 47 formed through an open cup member 44a constituting part of said diaphragm piston, although only one opening is shown in the drawing for simplicity. These openings 47 are similar in their arrangement and function to those shown at 48 as will be described hereinafter.

Flanged piston cup 44a is provided rigidly with a rod 49 which passes slidably and sealingly through the thickened end wall 43a of cylinder 43 rigidly mounted on the stationary chassis member or toe board 13. As will be described hereinafter, this piston rod 49 is arranged to cooperate with brake pedal 17 when the latter is actuated by the driver's foot pressure when operated conventionally for initiating a braking operation. The opposite cylinder end 43b is fitted with an air cleaner member 50 which is preferably made of a mass of asbestos wool for allowing ambient air to pass from outside through the cleaner into the cylinder chamber.

Return spring 51 is provided under compression between said piston cup 44a and the cylinder member 43. Valve member 52 formed into a double disc type is provided in the cylinder chamber so as normally to close a reduced passage at 53. For this purpose, a spring 54a is provided under compression between one of the discs and the intermediate cylinder wall which defines said reduced passage 53. Cylinder chamber 45 is fluidically connected through connecting pipe 54 to the constant pressure chamber 31, and further through said piping 35 to said vacuum source 36.

Cylinder chamber 46 is fluidically connected through piping 55 to a chamber 56 forming a part of control valve assembly L.

The end at 23c of the hydraulic cylinder 23 is fluidically connected through piping 57 to a conventional vehicle wheel cylinder 58 adapted for applying and releasing braking effort upon a plurality of vehicle wheels. On account of its similarity, the wheel cylinder 58 and its related working parts are shown in highly simplified schematic manner for simplicity of the drawing.

Control valve assembly L is shown in FIG. 2 in its detailed construction. It comprises valve block 39 and cover 40, as was discussed previously. The bolt connection between two pieces is illustrated at 80 as an example.

In the cylinder 27, there is slidably mounted a hydraulic piston 65 which is formed with an axial projection 65a and a recess 65b at the opposite ends of the piston which is positioned normally in such a way that said projection 65a abuts against the left-hand end wall 27a of the cylinder. Rod 63 is fixedly attached to diaphragm piston 62 comprising a flanged cup 62a and formed with said openings 48. Rod 63 is held with its free end in pressure engagement with said recess 65b. For insuring effective sealing between said hydraulic piston 65 and said cylinder 27, sealing means 66 and 27 are mounted on the piston. Stop ring 68 having a central opening 68a is mounted on the cylinder wall 27 and kept in position by snap ring 69, so as to limit the right-hand stroke of said piston 65, said rod 63 passing with certain clearances through said opening 68a.

A further diaphragm piston 60 is fixedly attached to said piston 62, thus constituting a double diaphragm piston, with said rod 63 being connected rigidly with said piston 60. Said vacuum chamber 37 is defined between said both diaphragm pistons 60 and 62, as will be clearly seen from the drawing.

Ring 70 is provided for fixedly attaching the diaphragm parts 60a and 62b of respective pistons 60 and 62 to the cylinder wall 39a formed in valve block 39 and the adjoining end surface 40b of cover 40, respectively. Ring 70 is formed with at least one communication opening 71 for keeping the duct 38 in permanent communication with vacuum chamber 37. By screwing the bolts 80 tightly, the said attachment of the diaphragm 60a and 62b will be further assured.

Said openings 48 are formed through the cup-shaped or cylindrical wall part of the flanged cup 62a and serve normally for establishing fluid communication between chambers 37 and 42.

Return spring 72 is provided between the double piston 60, 62 and the intermediate ring wall 40a of cover 40.

Tubular member 61 is fixedly attached to said ring wall 40a, so as to provide an opening 74 extending between vacuum chamber 42 and air chamber 83, said opening being normally closed by valve means generally shown at 75 and said air chamber 83 being kept in permanent communication with ambient atmospheric air through an inlet piping 76 which leads to air cleaner 73 as shown in FIG. 1.

Valve means 75 comprises a rubber disc 75a and a backup disc 75b to constitute a composite, yet practically unitary valve disc assembly which is attached fixedly to connector rod 77 at its one end by means of bolt and nut shown at 78, while the opposite end of said rod is connected to another valve disc 79 at 77a. Valve disc 79 serves to close communication opening 62c formed in the diaphragm piston 62 when said double piston is moved rightwards by applying an increased hydraulic pressure upon the hydraulic piston 65, as will be described more in detail hereinafter.

For assuring the normal closure of the opening 74 by the disc assembly 75a–75b, there is provided return spring 82 under compression between valve disc 79 and intermediate ring wall 40a.

The operation of the first embodiment so far shown and described is as follows.

The conditions shown in FIGS. 1 and 2 are those with the vehicle brakes released. Under these conditions, when a foot pressure is applied onto the pedal 17 to move the pedal 17 to an advanced position such as shown by chain-dotted lines at 17' for actuating the brake system, hydraulic master cylinder piston 11 will be moved to right in FIG. 1 against the spring action at 12, thereby causing increased oil pressure within the cylinder chamber 10b to be conveyed through piping 20 and port 21 to hydraulic chamber 23b, and through bore 24a into the interior space of cylinder 23, and simultaneously through duct 26 into control chamber 27.

By virtue of the thus increased hydraulic pressure prevailing in the chamber 27, hydraulic piston 65 is moved towards the right in FIG. 2, thereby causing mechanical pressure to be applied from the piston 65 through rod 63 to the double diaphragm piston 60, 62 to move the latter in the same direction against the action of return spring 72 and thus causing communication opening 62c to be brought into its closed condition by contact with vacuum valve disc 79. Further movement of the double piston will urge the valve assembly 79, 77 and 75 towards the right in FIG. 2 against the action of spring 82, thereby causing valve opening 74 to be opened by the receding movement of the disc assembly 75 and allow ambient air to enter from outside through air cleaner 73, piping 76 and air chamber 83 into vacuum chamber 42. The thus entering air is conveyed from chamber 42 through piping 41 into variable pressure chamber 30, thereby causing power piston 29 to be urged to move against the spring 32 to the right in FIG. 1, together with piston rod 34 which closes the left-hand end of bore 24a. By further movement of power piston 29 to the right, mechanical pressure is transmitted from the power piston through its rod to hydraulic piston 24. With bore 24a now being closed, the latter piston is moved against the action of return spring 25 towards the right and the hydraulic pressure prevailing within the cylinder 23 is increased. By the foot pressure exerted upon the pedal, the increased hydraulic pressure will be initially applied to the wheel cylinder 58 to exert a certain braking effort to the related wheel (in practice in plural). Upon the actuation of the power piston, however, the hydraulic pressure prevailing within the cylinder will be boosted up, thereby causing an increased boosted-up braking effort to be applied to the related vehicle wheel.

As is commonly known to those skilled in the art, the cooperating mode between the valve disc 79 and the double piston is in practice, pulsative by virtue of frequent and repeated mutual engagement and disengagement of said both parts caused by intermittent opening of the valve disc assembly 75a–75b which are carried into effect by pressure fluctuations in the chamber 42. This operation will continue as long as the pedal 17 is maintained in its depressed position such as at 17'.

Should the hydraulic pressure in the piping 20 fail to reach a predetermined value for actuation of the vehicle brake at 58 by unintentional troubles caused by excess wear of sealing means such as at 59 between master cylinder 10 and hydraulic piston 11, or breakage of the same sealing means, oil leakages from said piping 20 and/or even by bursting thereof, the master cylinder does not act to resist the pressure being impressed upon the brake pedal even when the latter is depressed for braking. In such a failure case, the booster assembly and thus the wheel brake will not be actuated and the vehicle is thus in a very dangerous condition.

In the present embodiment, however, there is provided safety valve assembly F as shown and described previously. Therefore under such a dangerous condition foot pressure exerted upon the pedal 17 will make the latter travel beyond its regular actuating position into mechanical contact with the push rod 49 of diaphragm piston 44, thereby causing the latter to be moved rightwards in FIG. 1 until it will have been brought into contact with valve member 52 so that communication openings 47 is interrupted from communication with cylinder chamber 46. The reduced passage 53 will be opened by virtue of the rightward movement of said valve member 52 and be brought into communication with ambient atmospheric air which will thus enter into cylinder chamber 46. This atmospheric air will then flow from said chamber 46 through piping 55 into the chamber 56 of control valve assembly L. By virtue of this increased air pressure now prevailing in the chamber 56, a considerable pressure difference will be established between chambers 56, on the one hand, and 37 and 42, on the other hand. The double piston 60, 62 will be urged fluidically by the present pressure difference in the right-hand direction against the action of spring 72 as in the case when an increased hydraulic pressure is applied to the left-hand end of hydraulic piston 65. Valve 75 is moved to the right to allow ambient atmospheric air to be introduced into the variable pressure chamber 30 move power piston 29 rightwards against the action of spring 32. Thus the desired boosted braking action is brought about. It will be understood from the foregoing description that in this case, the booster effect depends upon the foot pressure exerted upon the brake pedal and transmitted therefrom through push rod 49 to diaphragm piston 44.

When foot pressure is released in the aforementioned dangerous or emergency conditions, the foot pedal is thus caused to return to its rest position shown by the action of return spring 19, and the diaphragm piston 44 together with push rod 49 is also returned to the off-service position under the influence of return spring 51 and all working parts will return back to their respective off-service positions shown in FIGS. 1 and 2.

The returning operation under the regular or non-emergency working conditions of the said embodiment would be obvious to any person skilled in the art from the foregoing disclosure. It would suffice to mention that upon release of foot pressure from the brake pedal which is thus returned again to its rest position shown, the return being assisted by auxiliary return spring 12 through master piston 11 and actuator rod 16. Thus all the working parts will be returned to their respective rest positions shown.

Referring to FIG. 3, the second embodiment will be described in detail. This embodiment is substantially similar in its arrangement as well as function of working parts. Therefore, the same reference symbols and numerals have been used as before, but adding to each a prime symbol. The corresponding construction and working modes of these similar parts can easily be understood by reference to the foregoing detailed description of the first embodiment without giving further analysis of them. The main difference between the first and second embodiment resides in the provision of a pair of auxiliary hydraulic cylinder units D and E, the pistons 92 and 93 of which are adapted to be actuated under the influence of the hydraulic pressure supplied from the main hydraulic cylinder unit C' which is similar in its construction and function to those of the foregoing hydraulic unit C shown in FIG. 1. With the main hydraulic piston of the unit C not being actuated, both auxiliary pistons 92 and 93 are kept in their rest or right-hand extreme positions shown as abutting against their respective stop means 101 and 102, respectively, which are formed integral with respective cylinders 90 and 91. These cylinders are divided respectively into two chambers 90, 90a and 91, 91a. In the chambers 90a and 91a there are provided said pistons 92 and 93 which are urged by respective backup springs 94 and 95 housed in chambers 90a and 91a, respectively, these last mentioned chambers being fluidically connected through respective ports 96 and 97, and respective pipings 84 and 85 to independent wheel cylinders 86 and 87, respectively. These wheels may be front and rear vehicle wheels. Connecting passages 88 and 89 are provided respectively to fluidically connect the main cylinder chamber 23' to auxiliary cylinder chambers 90 and 91, respectively.

In the operation of the aforementioned second embodiment under its regular operating conditions, when an increased hydraulic pressure is transmitted to the main hydraulic cylinder 23' as before for actuating the brake system, auxiliary pistons 92 and 93 are moved in the left-hand direction in FIG. 3 against the action of respective backup springs 94 and 95 and thus an increased hydraulic pressure will be generated respectively within the auxiliary chambers 90a and 91a and transmitted therefrom through ports 96, 97 and pipings 84, 85 to respective wheel cylinders 86, 87, so as to apply a boosted braking effort upon the respective wheels.

When unintentional failure or lack of pressure increase should occur within brake piping 20', the resulting operation will be substantially same as before.

Should similar trouble occur within either of the respective independent downstream brake pipings 84 and 85, that is, in a second kind of emergency condition, wherein pipings shown at 84 should burst, increased hydraulic pressure will act upon the upper auxiliary piston 92 which is thus moved leftwards against the spring action 94 until it is brought into left-hand extreme position. Then hydraulic pressure prevailing in the cylinder chamber is elevated and the piston 93 will travel leftwards against the spring action at 95, thereby the hydraulic pressure in chamber 91a being correspondingly increased and the increased hydraulic pressure will be conveyed through port 97 and piping 85 to the wheel cylinder 87 so as to provide a brake action upon the related vehicle wheel.

While the invention has been shown and described as embodied in only two specific embodiments, it is not intended to limit the present invention to the details shown, since various modifications and structural changes may be made without departing from the spirit of the invention.

Without further detailed description, the foregoing will fully reveal the essence of the present invention that those skilled in the art can, by applying current knowledge, readily adapt it for various applications without omitting features that, from the standpoint of prior art, fairly constitute essential characteristics of the generic or specific aspects of this invention. Therefore, such adaptations should be intended to be comprehended within the range of equivalence of the following claims.

What is claimed as new and desired to be secured by Letters Patent is:

1. A vehicle brake system comprising a foot-operated brake pedal, a hydraulic master cylinder actuated by said pedal when said pedal is actuated by a vehicle operator, pneumatic and hydraulic booster means fluidically connected between said master cylinder and vehicle wheel brake cylinder means, control valve means including a combined hydraulic and pneumatic piston assembly movably mounted in said control valve means, said control valve means being adapted for receiving hydraulic pressure from said master cylinder and for conveying atmospheric air pressure as a function of said received hydraulic pressure to the pneumatic portion of said booster means, thereby causing a boosted hydraulic brake pressure to be generated and conveyed to said wheel brake cylinder means, and a safety valve means mounted in close proximity to said foot pedal and adapted for actuation by said pedal upon movement of said pedal beyond a predetermined operating stroke, said safety valve means being pneumatically connected with said control valve means to allow atmospheric air to actuate said control valve means to control the flow of atmospheric air pressure to the pneumatic portion of said booster means, whereby said booster means is actuated to provide brake pressure to said vehicle wheel brake means in response to said safety valve means upon loss of hydraulic pressure created by said master cylinder.

2. A vehicle brake system as set forth in claim 1, wherein said safety valve means comprises a stationary cylinder, a diaphragm piston movably mounted therein and dividing said cylinder into two chambers, a push rod rigidly connected with said diaphragm and adapted for mechanical engagement with said foot pedal when the working stroke of said pedal exceeds a predetermined value, a valve means located in one chamber of said cylinder for actuation by movement of said diaphragm piston to allow atmospheric air pressure to enter said one chamber when said valve means is actuated by said diaphragm piston and to communicate with said control valve means for actuation of said control valve means.

3. A vehicle brake system as set forth in claim 1, wherein said combined hydraulic and pneumatic piston assembly of said control valve means comprises a hydraulic piston connected to two flexible pneumatic diaphragms for separating the interior space of said control valve means into three separate chambers, one chamber for receiving hydraulic pressure from said master cylinder, a second chamber for receiving atmospheric pressure when said safety control valve is actuated, and a third chamber for controlling the pneumatic pressure to said pneumatic portion of said booster assembly, the response of said third chamber controlled by the pressure difference between said third chamber and said first and second chambers, whereby, upon loss of hydraulic pressure for actuating said control valve means and said booster assembly, atmospheric pressure admitted to said second chamber by said safety control valve means acts to move said booster to actuate the vehicle wheel brake means.

4. Vehicle brake system as set forth in claim 1, wherein said vehicle brake system further comprises auxiliary hydraulic cylinders having respective hydraulic pistons slidable therein, said auxiliary cylinders being in fluid communication with the hydraulic portion of said combined booster means, each of said auxiliary cylinders being hydraulically connected with respective separate wheel brake cylinders for providing a boosted brake effort thereto.

References Cited

UNITED STATES PATENTS

| | | | |
|---|---|---|---|
| 2,373,272 | 4/1945 | Stelzer | 60—54.5PX |
| 3,094,843 | 6/1963 | Martin | 60—54.5P |
| 3,424,281 | 1/1969 | Tsuneo Kawabe et al. | 60—54.5PX |
| 3,434,388 | 3/1969 | Julow et al. | 91—6 |

MARTIN P. SCHWADRON, Primary Examiner

R. R. BUNEVICH, Assistant Examiner

U.S. Cl. X.R.

303—13; 91—6